US011677326B2

(12) United States Patent
Yang et al.

(10) Patent No.: US 11,677,326 B2
(45) Date of Patent: Jun. 13, 2023

(54) LLC RESONANT CONVERTER AND METHOD OF CONTROLLING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 132 days.

(21) Appl. No.: 17/331,947

(22) Filed: May 27, 2021

(65) Prior Publication Data
US 2022/0103080 A1 Mar. 31, 2022

(30) Foreign Application Priority Data

Sep. 30, 2020 (CN) .......................... 202011056300.3

(51) Int. Cl.
*H02M 3/335* (2006.01)
*H02M 1/00* (2006.01)
*H02M 1/08* (2006.01)

(52) U.S. Cl.
CPC ..... *H02M 3/33573* (2021.05); *H02M 1/0009* (2021.05); *H02M 1/0035* (2021.05); *H02M 1/08* (2013.01); *H02M 3/33592* (2013.01)

(58) Field of Classification Search
CPC ........... H02M 3/33573; H02M 1/0009; H02M 1/0035; H02M 1/08; H02M 3/33592; H02M 3/33584; H02M 1/0032; H02M 1/15; H02M 3/01
See application file for complete search history.

(56) References Cited

U.S. PATENT DOCUMENTS

| 10,903,748 | B2 * | 1/2021 | Escudero Rodriguez ................... H02M 3/33576 |
| 11,407,322 | B2 * | 8/2022 | Liu .......................... B60L 53/14 |
| 2015/0229225 | A1 * | 8/2015 | Jang ....................... H02M 3/285 363/17 |

(Continued)

FOREIGN PATENT DOCUMENTS

TW 200843315 A 11/2008

OTHER PUBLICATIONS

Office Action dated Aug. 26, 2023 of the corresponding Taiwan patent application No. 109134007.

*Primary Examiner* — Kyle J Moody
(74) *Attorney, Agent, or Firm* — Muncy, Geissler, Olds & Lowe, P.C.

(57) ABSTRACT

An LLC resonant converter includes a transformer and a primary-side circuit coupled to the transformer. The primary-side circuit includes a first bridge arm, a second bridge arm, and a control unit. The first bridge arm includes a first switch and a second switch, and the second bridge arm includes a third switch and a fourth switch. The control unit provides a first control signal to control the first switch and provides a fourth control signal to control the fourth switch. The control unit adjusts a switching frequency of the first control signal and the fourth control signal according to an output voltage. When the switching frequency increases to a frequency threshold value, the switching frequency is controlled to be fixed at the frequency threshold, and the first control signal and the fourth control signal are controlled to have a variable phase difference.

16 Claims, 6 Drawing Sheets

(56) References Cited

U.S. PATENT DOCUMENTS

| | | | |
|---|---|---|---|
| 2016/0105120 A1* | 4/2016 | Hirano | H02M 3/33584 363/17 |
| 2016/0111964 A1* | 4/2016 | Oki | H02M 3/3378 363/21.02 |
| 2016/0172989 A1* | 6/2016 | Lee | H02M 3/33592 363/21.02 |
| 2017/0353111 A1* | 12/2017 | Elasser | H02M 1/08 |
| 2019/0200441 A1* | 6/2019 | Zhu | H02M 1/081 |
| 2021/0359613 A1* | 11/2021 | Leirens | H02M 1/4233 |
| 2022/0052611 A1* | 2/2022 | Ngoua Teu Magambo | H02M 3/33584 |
| 2022/0103082 A1* | 3/2022 | Yang | H02M 3/01 |

* cited by examiner

LLC RESONANT CONVERTER AND METHOD OF CONTROLLING THE SAME

BACKGROUND

Technical Field

The present disclosure relates to an LLC resonant converter and a method of controlling the same, and more particularly to an LLC resonant converter operating in a light-load or no-load condition and a method of controlling the same.

Description of Related Art

The statements in this section merely provide background information related to the present disclosure and do not necessarily constitute prior art.

The LLC resonant converter is a DC-to-DC power converter having features of turning on primary-side switches with zero voltage and turning off secondary-side rectifying switches with zero current, and therefore it has advantages of high output power and high conversion efficiency compared with other converters. Furthermore, it is easier to achieve high efficiency and high power density by using synchronous rectifying switches on the secondary side of the LLC resonant converter.

However, the current manner of controlling the LLC resonant converter, with reference to FIG. 1, is that the first switch Q1 and the fourth switch Q4 on the primary side use the same PWM control signal, and the second switch Q2 and the third switch Q3 on the primary side use the same PWM control signal. In order to stabilize the output voltage within the specification range under light-load or no-load, the existing practice usually adopts the following manners. The first one is to operate the switching frequency of the switch control signal at a higher frequency. However, this manner may cause the output voltage to be unstable under the no-load condition, and an additional dummy load is required or the limitation of the minimum load current is required. The second one is to operate the switching frequency of the switch control signal at a higher frequency and perform a burst control mode, or to reduce the duty cycle of the primary side switches control signal. However, this manner may cause the switches to withstand greater voltage stress and produce greater voltage ripple of the output voltage.

Therefore, how to design an LLC resonant converter and a method of controlling the same to reduce the voltage ripple of the output voltage and reduce the voltage stress of the switches under the light-load or no-load condition when the LLC resonant converter normally operates is a major topic for the inventors of the present disclosure.

SUMMARY

In order to solve the above-mentioned problems, the present disclosure provides an LLC resonant converter. The LLC resonant converter converts an input voltage into an output voltage. The LLC resonant converter includes a transformer, a primary-side circuit, and a control unit. The primary-side circuit is coupled to a primary-side winding of the transformer. The primary-side circuit includes a first bridge arm and a second bridge arm. The first bridge arm includes a first switch and a second switch connected to the first switch in series, and receives the input voltage. The second bridge arm is connected to the first bridge arm in parallel, and includes a third switch and a fourth switch connected to the third switch in series. The control unit provides a first control signal to control the first switch, and provides a fourth control signal to control the fourth switch. The control unit adjusts a switching frequency of the first control signal and the fourth control signal according to the output voltage. When the switching frequency increases to a frequency threshold value, the control unit controls the switching frequency to be fixed at the frequency threshold value, and controls the first control signal and the fourth control signal having a variable phase difference.

In order to solve the above-mentioned problems, the present disclosure provides a method of controlling an LLC resonant converter. The LLC resonant converter includes a primary-side circuit having a first bridge arm and a second bridge arm connected in parallel, and the first bridge arm has a first switch and a second switch connected to the first switch in series, and the second bridge arm has a third switch and a fourth switch connected in series. The method includes steps of: providing a first control signal to control the first switch and providing a fourth control signal to control the fourth switch to convert an input voltage into an output voltage, adjusting a switching frequency and a phase difference of the first control signal and the fourth control signal according to the output voltage, and controlling the switching frequency to be fixed at a frequency threshold value and adjusting the phase difference of the first control signal and the fourth control signal when the switching frequency increasing to the frequency threshold value.

The main purpose and effect of the present disclosure is to control switch elements of the first bridge arm and the second bridge arm by providing the first control signal and the fourth control signal with a fixed frequency and a variable phase difference so that the LLC resonant converter can be used under the light-load or no-load condition without increasing the switching frequency or decreasing the duty cycle of the first control signal and the fourth control signal to reduce the voltage ripple of the output voltage and reduce the voltage stress and the current stress on the first bridge arm and the second bridge arm.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
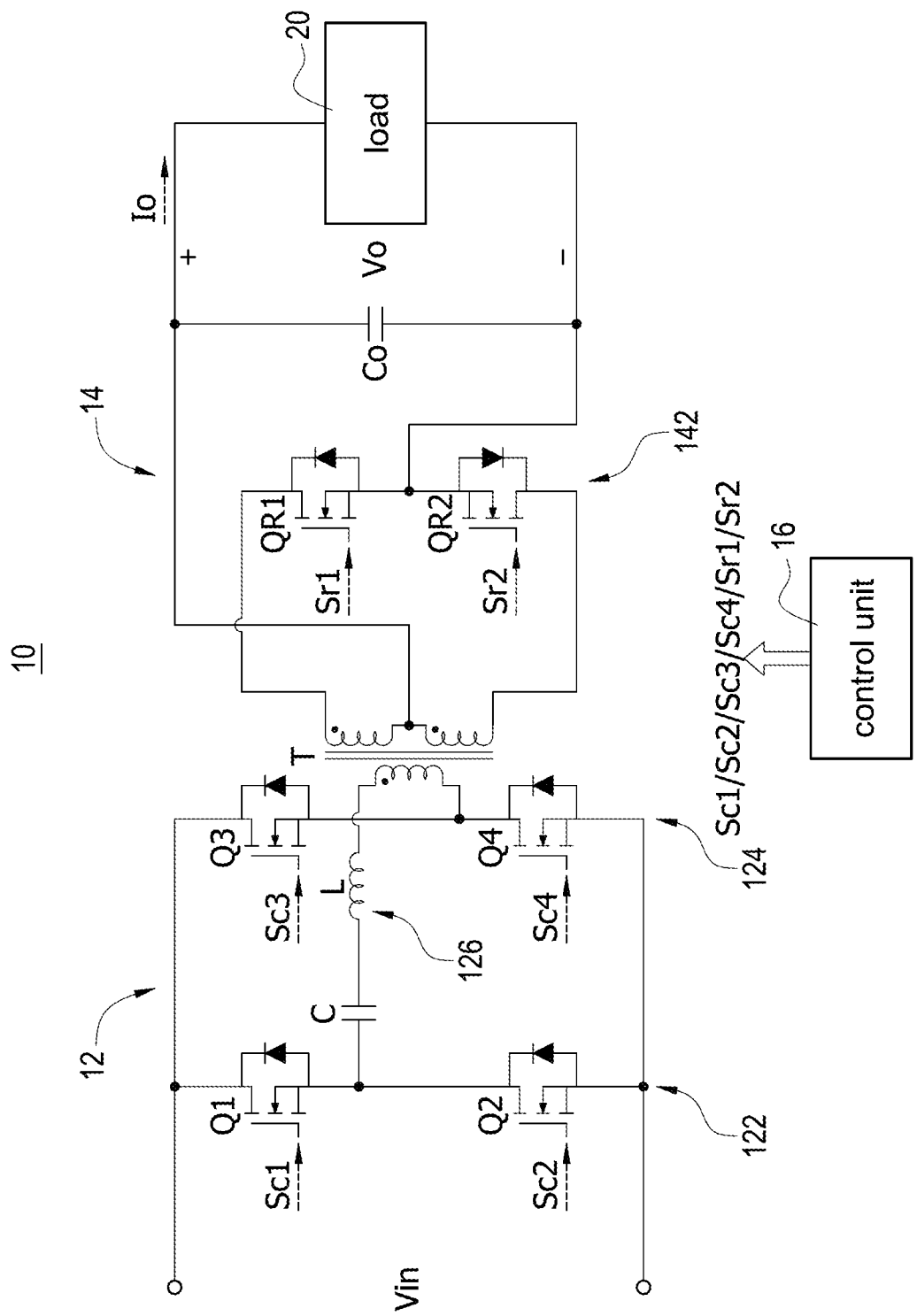
FIG. 1 is a block circuit diagram of an LLC resonant converter according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of an LLC resonant converter according to a first embodiment of the present disclosure. The LLC resonant converter 10 includes a transformer T, a primary-side circuit 12, a secondary-side circuit 14, and a control unit 16. The transformer T is coupled to the primary-side circuit 12 and the secondary-side circuit 14. The control unit 16 provides control signals Sc1, Sc2, Sc3, Sc4, Sr1, Sr2 to control the primary-side circuit 12 and the secondary-side circuit 14 so as to convert an input voltage Vin into an output voltage Vo for supplying power to a load 20. The secondary-side circuit 14 includes a rectifying circuit 142 and an output capacitor Co. The rectifying circuit 142 may be a half-bridge structure composed of a first rectifying switch QR1, a second rectifying switch QR2, and a transformer T with a center-tapped secondary-side winding. The output capacitor Co is coupled to the rectifying circuit 142 and the load 20. The first rectifying switch QR1 and the second rectifying switch QR2 are not limited to synchronous rectifying switches, and may be also diodes. The primary-side circuit 12 includes a first bridge arm 122, a second bridge arm 124 connected to the first bridge arm 122 in parallel, and a resonant unit 126. The first bridge arm 122 includes a first switch Q1 and a second switch Q2 connected to the first switch Q1 in series, and the second bridge arm 124 includes a third switch Q3 and a fourth switch Q4 connected to the third switch Q3 in series. One end of the resonant unit 126 is coupled to a common-connected point between the first switch Q1 and the second switch Q2, and the other end of the resonant unit 126 is coupled to a common-connected point between the third switch Q3 and the fourth switch Q4 through a primary-side winding of the transformer T.

By detecting the output voltage Vo of the LLC resonant converter 10, the control unit 16 adjusts a first control signal Sc1 of controlling the first switch Q1, a second control signal Sc2 of controlling the second switch Q2, a third control signal Sc3 of controlling the third switch Q3, and a fourth control signal Sc4 of controlling the fourth switch Q4. In particular, the waveform of the first control signal Sc1 and the waveform of the second control signal Sc2 are substantially complementary, and the waveform of the third control signal Sc3 and the waveform of the fourth control signal Sc4 are substantially complementary. In addition, the control unit 16 further provides rectifying control signals Sr1, Sr2 to respectively control the first rectifying switch QR1 and the second rectifying switch QR2 of the rectifying circuit 142, so that the rectifying circuit 142 can perform synchronous rectifying operation. In particular, the resonant unit 126 of the LLC resonant converter is not limited to the connection structure shown in figures, and the structure that can generate two resonant frequencies using inductor (inductance) and capacitor (capacitance) should be embraced within the scope of the present disclosure.

Figure 2:
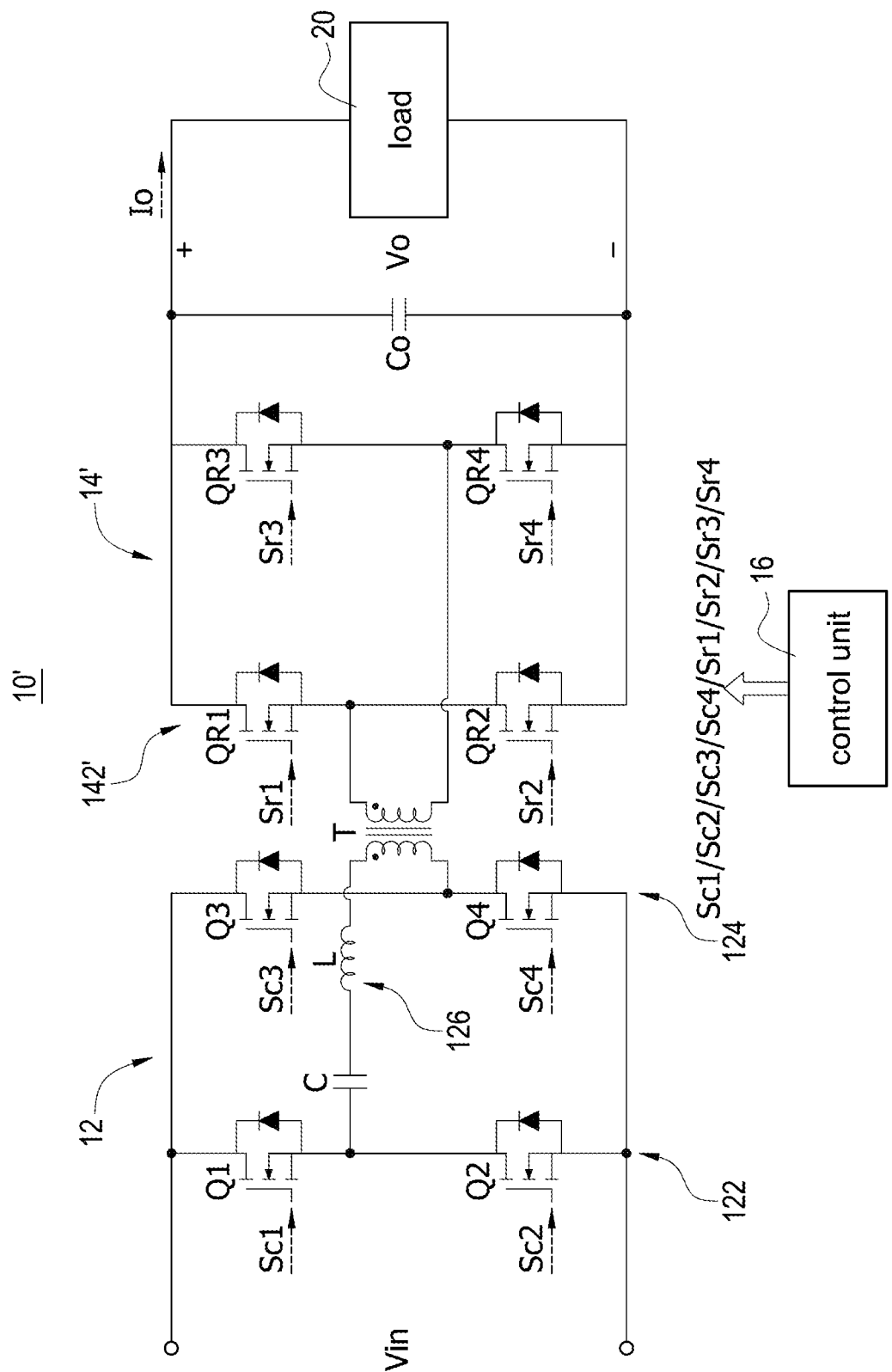
FIG. 2 is a block circuit diagram of the LLC resonant converter according to a second embodiment of the present disclosure.

Please refer to FIG. 2, which shows a block circuit diagram of the LLC resonant converter according to a second embodiment of the present disclosure, and also refer to FIG. 1. The major difference between the LLC resonant converter 10' shown in FIG. 2 and the LLC resonant converter 10 shown in FIG. 1 is that the rectifying circuit 142' of the secondary-side circuit 14' of the LLC resonant converter 10' is a full-bridge structure. The rectifying circuit 142' includes a first rectifying switch QR1, a second rectifying switch QR2, a third rectifying switch QR3, and a fourth rectifying switch QR4. The control unit 16 provides rectifying control signals Sr1, Sr2, Sr3, Sr4 to control the rectifying switches QR1, QR2, QR3, QR4, respectively so that the rectifying circuit 142' can perform synchronous rectifying operation. The circuit structure and control manner not mentioned in this embodiment are the same as those in FIG. 1 and will not be repeated here.

Figure 3:
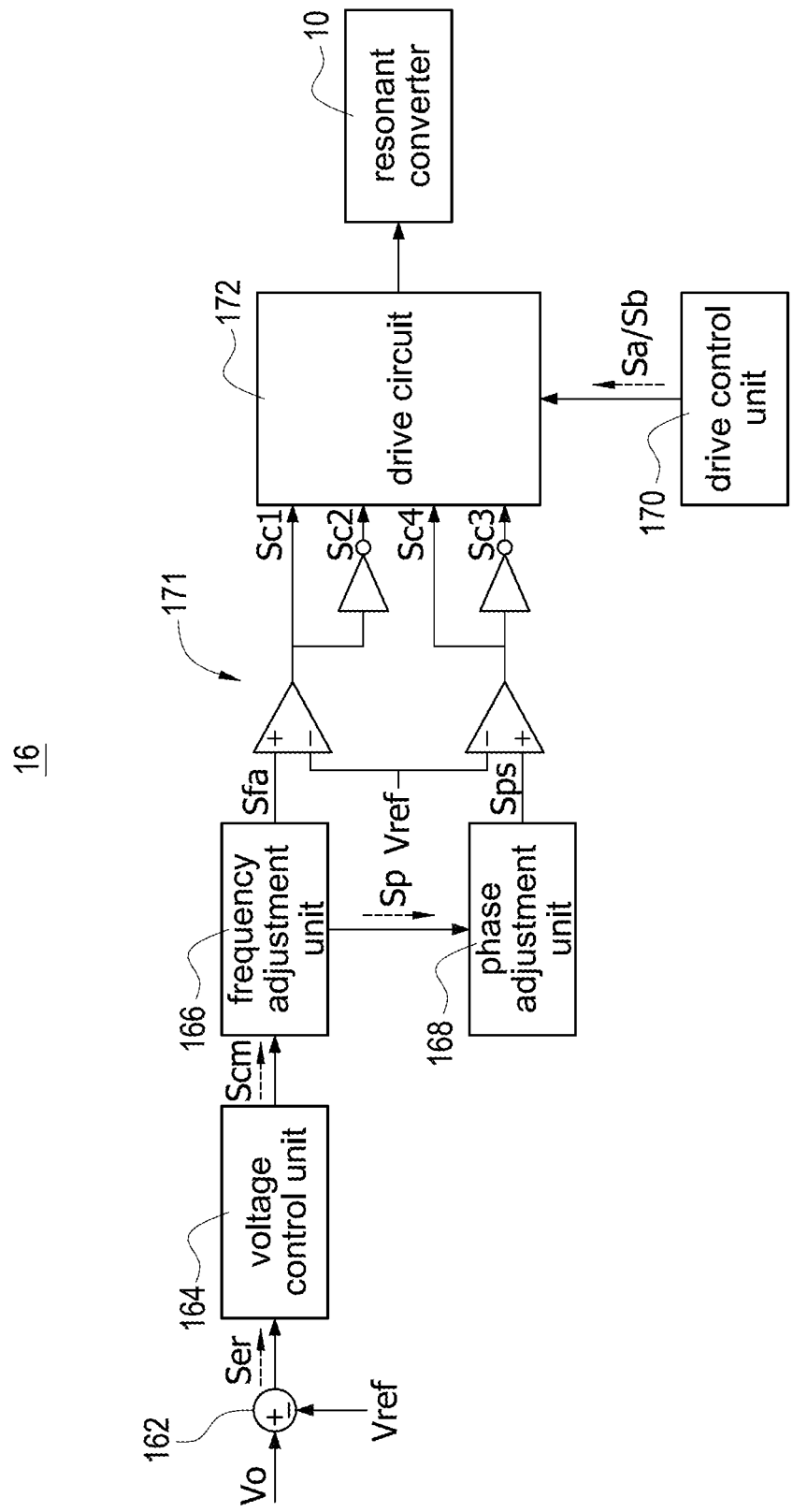
FIG. 3 is a block circuit diagram of a control unit according to the present disclosure.

Please refer to FIG. 3, which shows a block circuit diagram of a control unit according to the present disclosure, and also refer to FIG. 1 and FIG. 2. The control unit 16 includes a comparison unit 162, a voltage control unit 164, a frequency adjustment unit 166, and a phase adjustment unit 168. The comparison unit 162 receives the feedback value of the output voltage Vo and the reference voltage Vref used as the target value of the output voltage Vo. The voltage control unit 164 is coupled to the comparison unit 162 and the frequency adjustment unit 166. The phase adjustment unit 168 is coupled to the frequency adjustment unit 166. The frequency adjustment unit 166 and the phase adjustment unit 168 are coupled to a drive circuit 172 (described in detail below) to provide control signals Sc1, Sc2, Sc3, Sc4 to control the on or off of the switches Q1, Q2, Q3, Q4 of the primary-side circuit 12.

The comparison unit 162 calculates an error between the output voltage Vo and the reference voltage Vref to generate an error signal Ser. The voltage control unit 164 generates a frequency command Scm related to a switching frequency fsw of the control signals Sc1, Sc2, Sc3, Sc4 according to the error signal Ser. Since the frequency command Scm is related to the error between the output voltage Vo and the reference voltage Vref, and the output voltage Vo is varied with the loading of the load 20, the frequency command Scm corresponds to the load condition. When the load is heavier, the value of the frequency command Scm will be correspondingly decreased, and when the load is lighter, the value of the frequency command Scm will be correspondingly increased.

The frequency adjustment unit 166 correspondingly provides a frequency adjustment signal Sfa to adjust the switching frequency fsw of the control signals Sc1, Sc2, Sc3, Sc4 according to the frequency command Scm. When the frequency adjustment unit 166 determines that the switching frequency fsw of the control signals Sc1, Sc2, Sc3, Sc4 will be greater than a frequency threshold value fmax predetermined by the LLC resonant converter 10, the frequency adjustment unit 166 sets the switching frequency fsw of the control signals Sc1, Sc2, Sc3, Sc4 to be the fixed frequency threshold value fmax. Afterward, the frequency adjustment unit 166 provides a phase adjustment signal Sp to the phase adjustment unit 168, and notifies the phase adjustment unit 168 to provide a phase shift signal Sps to adjust a phase difference Ps between the first control signal Sc1 and the fourth control signal Sc4 so that the difference in degree between the first control signal Sc1 and the fourth control signal Sc4 gradually increases from a phase initial value Pp, for example but not limited to 0 degree. Since the waveform of the second control signal Sc2 and the waveform of the first control signal Sc1 are substantially complementary, and the waveform of the third control signal Sc3 and the waveform of the fourth control signal Sc4 are substantially complementary, a phase difference Ps between the second control signal Sc2 and the third control signal Sc3 can be adjusted by the same manner.

The control unit 16 further includes a pulse width modulation unit 171 and a drive circuit 172. The pulse width modulation unit 171 receives the frequency adjustment signal Sfa and the phase shift signal Sps to provide the control signals Sc1, Sc2, Sc3, Sc4. The frequency adjustment signal Sfa and the phase shift signal Sps may be triangle waves, and the comparison of the triangle waves with the reference voltage Vref to correspondingly generate the control signals Sc1, Sc2, Sc3, Sc4. The drive circuit 172 receives the control signals Sc1, Sc2, Sc3, Sc4 to drive the first bridge arm 122 and the second bridge arm 124 according to the control signals Sc1, Sc2, Sc3, Sc4. In particular, the pulse width modulation unit 171 may include various implement manners, and the circuit shown in FIG. 3 is only one of the implement manners, which is not limited to the present disclosure. In addition, the drive circuit 172 is capable of driving high-power switches by week-current signals, and therefore when the first bridge arm 122 and the second bridge arm 124 can be successfully driven by the control signals Sc1, Sc2, Sc3, Sc4 without using the drive circuit 172, the drive circuit 172 can be absent.

Please refer to FIG. 3 again, the control unit 16 further includes a drive control unit 170, and the control unit 16 further detects an output current Io (not shown). The drive control unit 170 is coupled to the drive circuit 172 and determines to provide an enabled signal Sa or a disable signal Sb to the drive circuit 172 according to the output voltage Vo and the output current Io, thereby enabling or disabling the drive circuit 172 (described in detail below). In one embodiment, under the absence of the drive circuit 172, the drive control unit 170 may be coupled to the pulse width modulation unit 171 through simple logic components, for example but not limited to AND gate(s), OR gate(s), and/or so on, and use the enabled signal Sa and the disabled signal Sb to control the output of the pulse width modulation unit 171. In one embodiment, the positions of the control signals Sc1, Sc2 and the positions of the control signals Sc3, Sc4 can be exchanged, that is, the output of the upper comparator of the pulse width modulation unit 171 may provide the control signals Sc3, Sc4 and the lower comparator of the pulse width modulation unit 171 may provide the control signals Sc1, Sc2. In particular, the components in the control unit 16 are not limited to this structure, and the components, circuit, or software programs that can achieve the same function (for example, the comparison function) should be embraced within the scope of the present disclosure.

Figure 4:
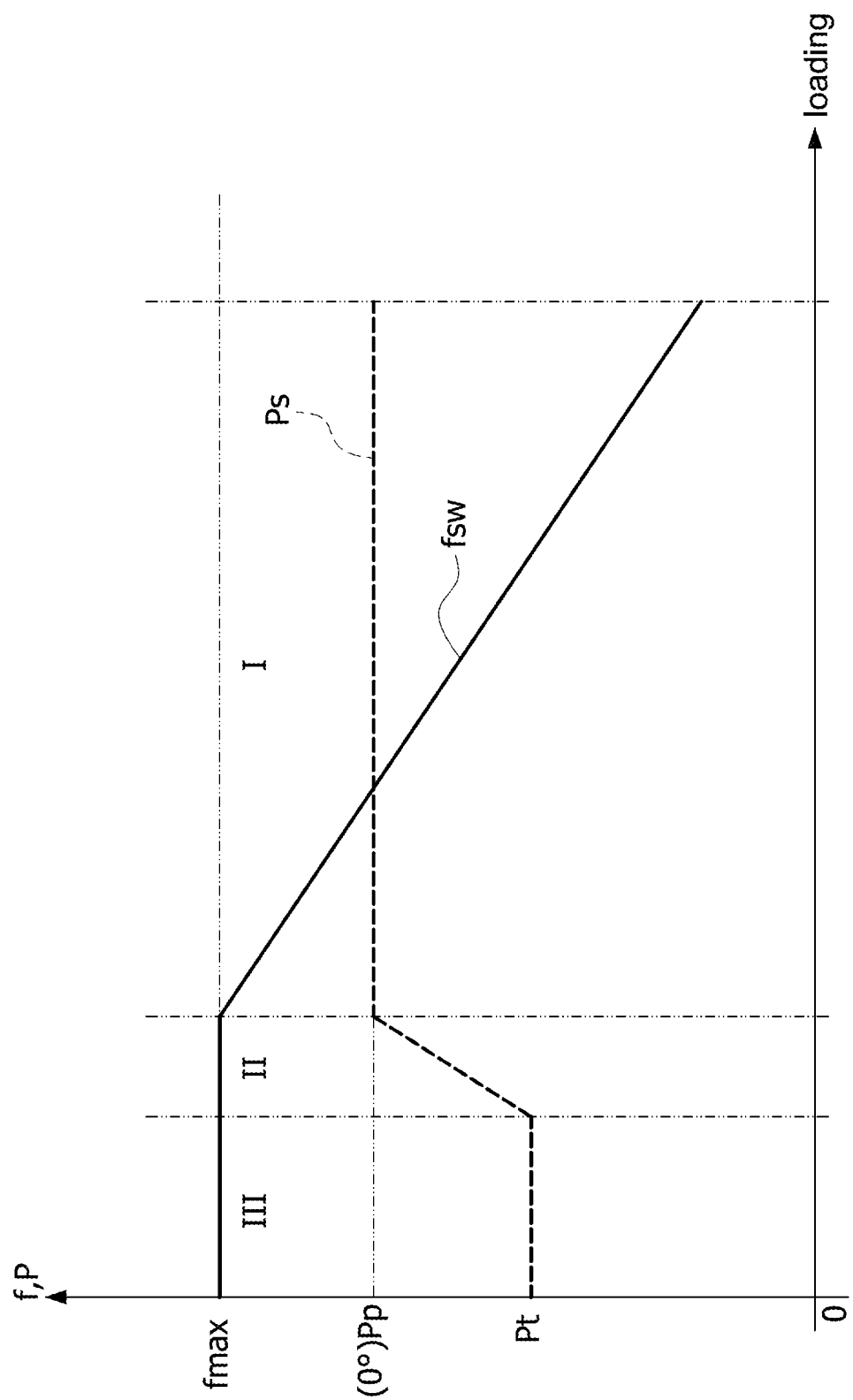
FIG. 4 is a curve of controlling the LLC resonant converter according to the present disclosure.

Please refer to FIG. 4, which shows a curve of controlling the LLC resonant converter according to the present disclosure, and also refer to FIG. 1 to FIG. 3. The vertical axis (Y axis) represents both the magnitude of the frequency f and the angle of the phase difference P, and the more up, the greater the magnitude of the frequency f and the smaller the angle of the phase difference P. The horizontal axis (X axis) represents the amount of error (corresponding to the loading of the load 20) between the output voltage Vo and the reference voltage Vref. In particular, there will be a predetermined switching frequency curve (shown by solid lines) according to the circuit specification of the LLC resonant converter 10. Under the corresponding frequency command Scm, the control unit 16 provides the switching frequency fsw of the control signals Sc1, Sc2, Sc3, Sc4 according to the predetermined switching frequency curve. In addition, another curve (shown by dashed lines) is a phase difference curve.

In an operation region I, the LLC resonant converter 10 operates in a normal loading condition of the load 20, and the control unit 16 enters a variable frequency mode. At this condition, a phase difference Ps between the first control signal Sc1 and the fourth control signal Sc4 is equal to a fixed phase initial value Pp, and the switching frequency fsw with the variation of the load 20 is provided. Since the second control signal Sc2 and the first control signal Sc1 are complementary and the third control signal Sc3 and the fourth control signal Sc4 are complementary, the phase difference Ps between the second control signal Sc2 and the third control signal Sc3 is also equal to the phase initial value Pp, and the switching frequency fsw with the variation of the load 20 is also provided. When the load 20 becomes heavier, the switching frequency fsw becomes lower, and when the load 20 becomes lighter, the switching frequency fsw becomes higher. When the switching frequency fsw continuously increases to the frequency threshold value fmax due to the lighter load, the control curve enters an operation region II.

In the operation region II, the control unit 16 controls the switching frequency fsw of the first control signal Sc1 and the fourth control signal Sc4 to be equal to the fixed frequency threshold value fmax, and the phase difference Ps between the first control signal Sc1 and the fourth control signal Sc4 is changed, that is, the control unit 16 enters a phase shift control mode. At this condition, the control unit 16 determines whether the output current Io is less than a current threshold value, for example but not limited to 6 amps. When the output current Io is not less than the current threshold value, it represents that the LLC resonant converter 10 is under the light-loading condition, and the control unit 16 continuously operates in the phase shift control mode. Therefore, the switching frequency of the first control signal Sc1 and the fourth control signal Sc4 remains fixed, and the phase difference Ps becomes larger as the output current Io decreases. Once the phase difference Ps continuously increases to a phase shift threshold value Pt, the control unit 16 enters an operation region III.

In the operation region III, the loading of the load 20 is no-load or close to no-load. The control unit 16 controls/maintains the switching frequency fsw of the first control signal Sc1 and the fourth control signal Sc4 to be equal to the frequency threshold value fmax. The phase adjustment unit 168 has also adjusted the phase difference Ps to the phase shift threshold value Pt, for example but not limited to 165 degrees to 135 degrees according to the circuit specification of the LLC resonant converter 10 so as to keep the phase difference Ps be equal to the phase shift threshold value Pt. At this condition, the control unit 16 continuously detects the output current Io, and when the output current Io is less than the current threshold value, the LLC resonant converter 10 enters the burst control mode. In this control mode, the control unit 16 further enables or disables the drive control unit 170 according to the output voltage Vo. In particular, when the control curve is still in the operation region II, that is, the phase difference Ps has not reached the phase shift threshold value Pt, the LLC resonant converter 10 directly enters the burst control mode when the control unit 16 detects that the output current Io is less than the current threshold value. Therefore, the phase difference Ps of the control signals Sc1, Sc4 (or Sc2, Sc3) will be equal to the phase difference Ps (between the phase initial value Pp and the phase shift threshold value Pt) when the control mode changes.

Figure 5:
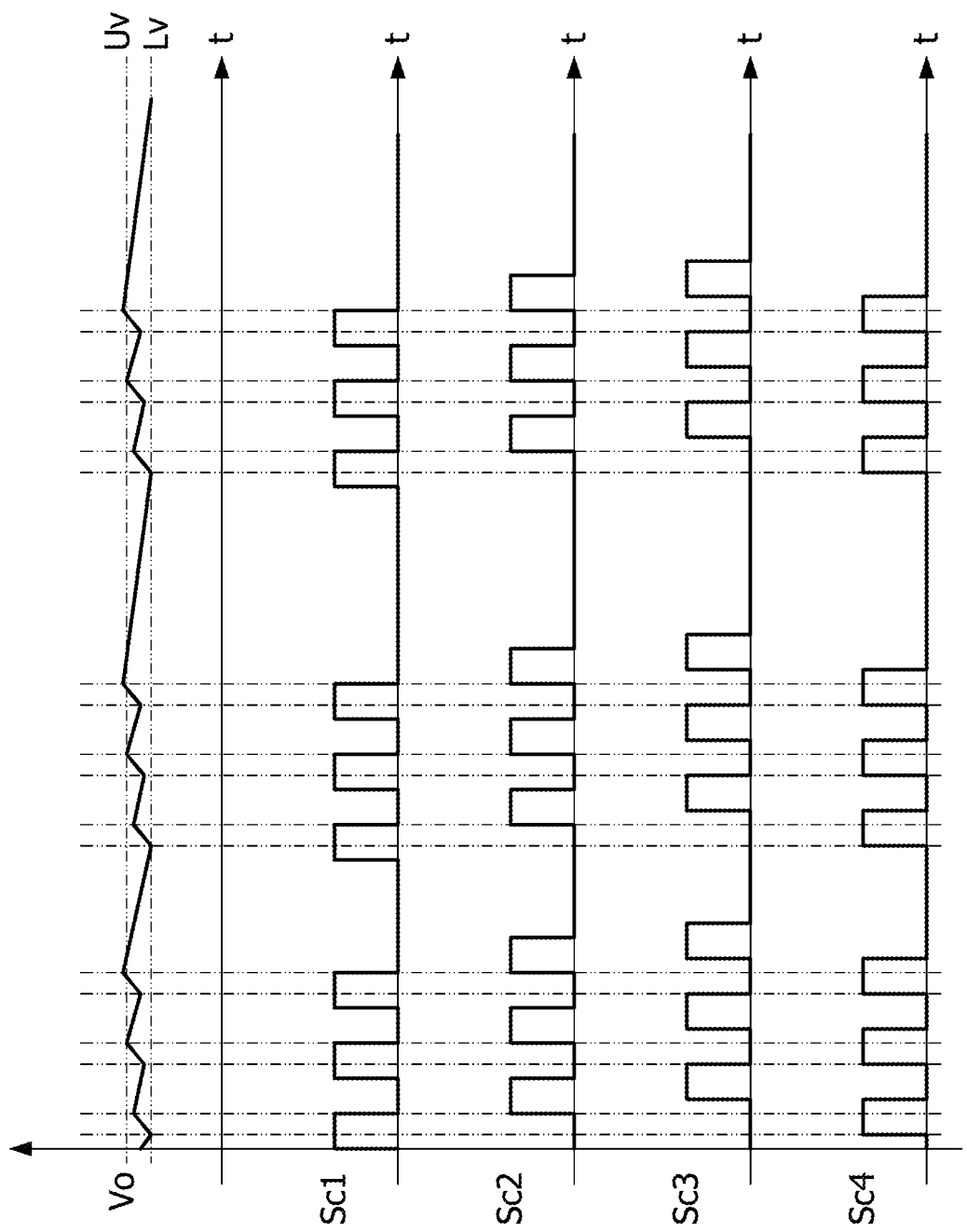
FIG. 5 is a schematic waveforms of the LLC resonant converter operating in a burst control mode according to the present disclosure.

Please refer to FIG. 5, which shows a schematic waveforms of the LLC resonant converter operating in a burst control mode according to the present disclosure, and also refer to FIG. 1 to FIG. 4. In the burst control mode, the control unit 16 controls the phase difference Ps between the first control signal Sc1 and the fourth control signal Sc4 to be fixed so that the switching of the first switch Q1 and the fourth switch Q4 has a fixed phase difference Ps. Also, the control unit 16 controls the switching frequency fsw of the first control signal Sc1 and the fourth control signal Sc4 to be fixed to the frequency threshold value fmax. Since the waveform of the second control signal Sc2 and the waveform of the first control signal Sc1 are complementary, and the waveform of the third control signal Sc3 and the waveform of the fourth control signal Sc4 are complementary, the switching of the second switch Q2 and the third switch Q3 also has the same fixed phase difference Ps and fixed switching frequency fsw. The control unit 16 further detects the output voltage Vo. When the output voltage Vo reaches an upper-limiting voltage value Uv, the drive control unit 170 sends the disabled signal Sb to the drive circuit 172 so that the drive circuit 172 is disabled (in a disabled mode) without providing the control signals Sc1, Sc2, Sc3, Sc4. Therefore, the first switch Q1, the second switch Q2, the third switch Q3, and the fourth switch Q4 are all turned off so that the output voltage Vo decreases. Once the output voltage Vo decreases to reach a lower-limiting voltage value Lv, the drive control unit 170 sends the enabled signal Sa to the drive circuit 172 so that the drive circuit 172 normally operates. Therefore, switches Q1, Q2, Q3, Q4 are turned on and turned off by the control signals Sc1, Sc2, Sc3, Sc4 so that the output voltage Vo increases. Accordingly, the output voltage Vo can be controlled in a predetermined range between the upper-limiting voltage value Uv and the lower-limiting voltage value Lv by the control unit 16, for example but not limited to that the voltage ripple of the output voltage Vo can be maintained within a fluctuation range of ±3%.

Figure 6:
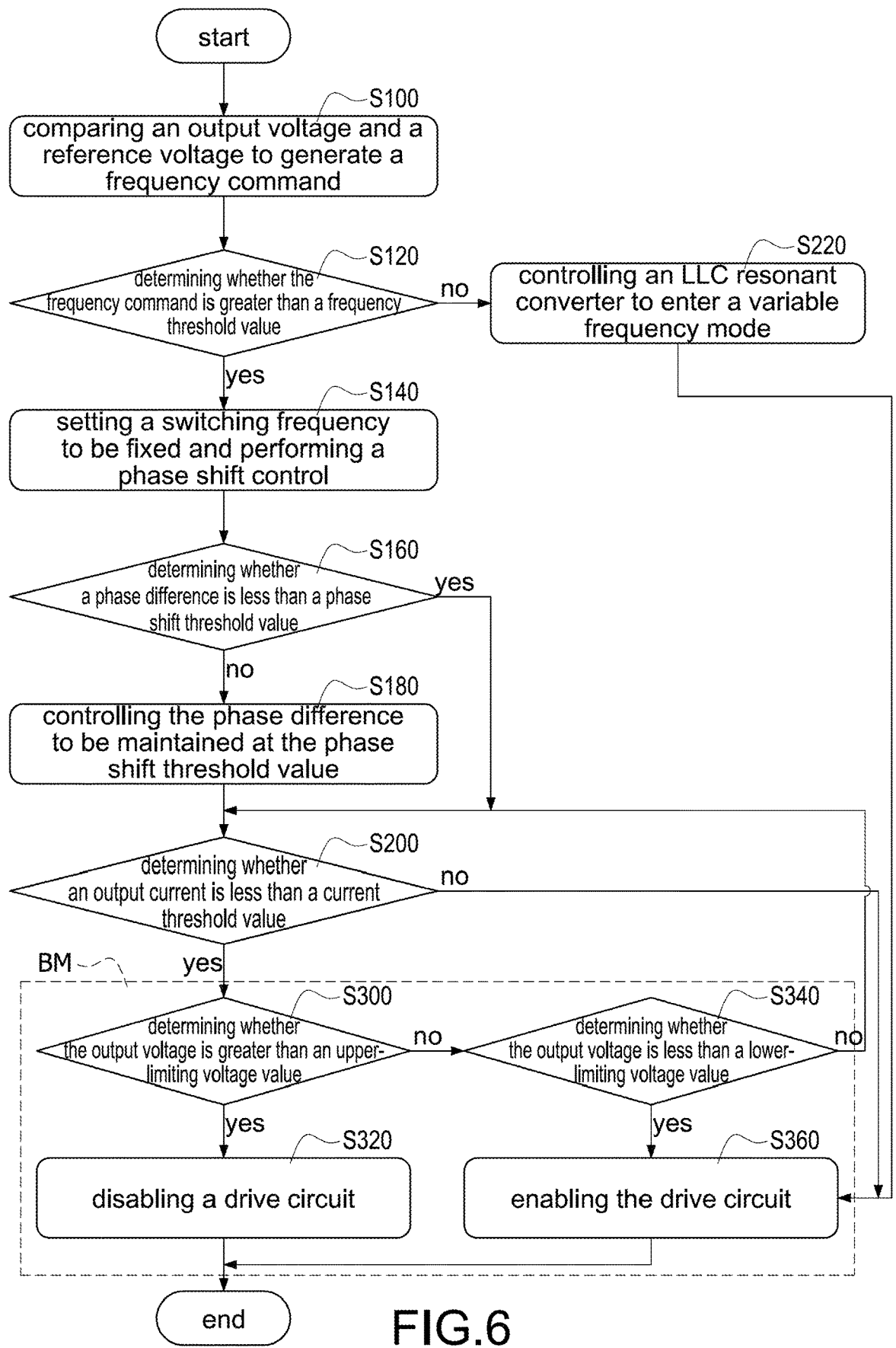
FIG. 6 is a flowchart of a method of controlling the LLC resonant converter according to the present disclosure.

Please refer to FIG. 6, which shows a flowchart of a method of controlling the LLC resonant converter according to the present disclosure, and also refer to FIG. 1 to FIG. 5. The method includes steps of: comparing an output voltage and a reference voltage to generate a frequency command (S100). The comparison unit 162 of the control unit 16 compares the output voltage Vo and the reference voltage Vref to provides an error signal Ser according to the comparison result. The voltage control unit 164 generates a frequency command Scm according to the error signal Ser, and the frequency command Scm is a target value of the switching frequency fsw of the control signals Sc1, Sc2, Sc3, Sc4. Afterward, determining whether the frequency command is greater than a frequency threshold value (S120). The frequency adjustment unit 166 receives the frequency command Scm, and determines whether the frequency command Scm is greater than the frequency threshold value. When the determination result of the step (S120) is "NO", the control unit controls the LLC resonant converter to enter a variable frequency mode (S220) and enables the drive circuit (S360). At this condition, the LLC resonant converter 10 operates under the normal loading. The control unit 16 controls the phase difference Ps between the first control signal Sc1 and the fourth control signal Sc4 to maintain the phase initial value Pp, and controls the switching frequency fsw of the first control signal Sc1 and the fourth control signal Sc4 is varied. Afterward, the drive control unit 170 provides an enabled signal Sa to the drive circuit 172 so that the drive circuit 172 normally operates. Therefore, the first switch Q1, the second switch Q2, the third switch Q3, and the fourth switch Q4 are turned on and turned off by control signals Sc1, Sc2, Sc3, Sc4. When the determination result of the step (S120) is "YES", that is, the switching frequency fsw is greater than the frequency threshold value, the switching frequency is set to be fixed and a phase shift control is performed (S140). When the switching frequency fsw will be greater than the frequency threshold value fmax, it means that the load 20 is in a light-loading condition, and therefore the switching frequency fsw is limited to the frequency threshold value fmax. The frequency adjustment unit 166 further provides a phase adjustment signal Sp to the phase adjustment unit 168 to change the phase difference Ps between the first control signal Sc1 and the fourth control signal Sc4.

Afterward, determining whether the phase difference is less than a phase shift threshold value (S160). When the determination result of the step (S160) is "NO", the control unit controls the phase difference to be maintained at the phase shift threshold value (S180). When the phase difference Ps is not less than the phase shift threshold value Pt, it means that the load 20 is in a lighter loading condition, and therefore the control unit 16 controls the phase difference Ps between the first control signal Sc1 and the fourth control signal Sc4 to be maintained at the phase shift threshold value Pt. Afterward, determining whether an output current is less than a current threshold value (S200).

When the determination result of the step (S200) is "NO", the control unit enables the drive circuit (S360). The drive control unit 170 provides the enabled signal Sa to the drive circuit 172 so that the drive circuit 172 normally operates. Therefore, the first switch Q1, the second switch Q2, the third switch Q3, and the fourth switch Q4 are turned on and turned off by the control signals Sc1, Sc2, Sc3, Sc4. When the determination result of the step (S200) is "YES", that is, the output current Io is less than the current threshold value, it means that the loading of the load 20 is no-load or close to no-load, and therefore, the control unit 16 controls the LLC resonant converter 10 entering a burst control mode BM. When the determination result of the step (S160) is "YES", the control unit 16 controls the LLC resonant converter 10 operating in the step (S200) with the current switching frequency fsw and phase difference Ps. In the burst control mode BM, the control unit 16 determines whether the output voltage is greater than an upper-limiting voltage value (S300). The upper-limiting voltage value Uv may be determined according to the upper limit of the voltage acceptable to the load 20 of the LLC resonant converter 10. When the determination result of the step (S300) is "YES", the drive circuit is disabled by a control signal (S320). That is, the drive control unit 170 provides the disabled signal Sb to disable the drive circuit 172 so that the switches Q1, Q2, Q3, Q4 are not controlled by the control signals Sc1, Sc2, Sc3, Sc4 and to be turned off. When the determination result of the step (S300) is "NO", the control unit 16 determines whether the output voltage is less than a lower-limiting voltage value (S340). The lower-limiting voltage value Lv may be determined according to the lower limit of the voltage acceptable to the load 20 of the LLC resonant converter 10. When the determination result of the step (S340) is "YES", the drive circuit is enabled by a control signal (S360). That is, the drive control unit 170 provides the enabled signal Sa to control the drive circuit 172 normally operating, and therefore the switches Q1, Q2, Q3, Q4 are turned on and turned off by the control signals Sc1, Sc2, Sc3, Sc4. When the determination result of the step (S340) is "NO", the step (S200) is performed. In particular, the determination of the output voltage and the upper-/lower-limiting voltage value in the step (S300) and the step (S340) can be assisted by calculating the amount of error between the output voltage Vo and the reference voltage Vref by the comparison unit 162.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An LLC resonant converter configured to convert an input voltage into an output voltage, the LLC resonant converter comprising:
   a transformer,
   a primary-side circuit coupled to a primary-side winding of the transformer, the primary-side circuit comprising:
      a first bridge arm comprising a first switch and a second switch connected to the first switch in series, and configured to receive the input voltage, and
      a second bridge arm connected to the first bridge arm in parallel, and comprising a third switch and a fourth switch connected to the third switch in series, and
   a control unit configured to provide a first control signal to control the first switch, and provide a fourth control signal to control the fourth switch,
   wherein the control unit is configured to adjust a switching frequency of the first control signal and the fourth control signal according to the output voltage; when the switching frequency increases to a frequency threshold value, the control unit controls the switching frequency to be fixed at the frequency threshold value, and controls the first control signal and the fourth control signal having a variable phase difference, and
   wherein when the switching frequency is equal to the frequency threshold value, the control unit controls the phase difference not to excess a phase shift threshold value.

2. The LLC resonant converter as claimed in claim 1, wherein when the control unit detects that an output current of the LLC resonant converter is less than a current threshold value, the control unit operates in a burst control mode.

3. The LLC resonant converter as claimed in claim 2, wherein in the burst control mode, the control unit controls the switching frequency to be the frequency threshold value, and controls the phase difference to be fixed.

4. The LLC resonant converter as claimed in claim 2, wherein in the burst control mode, the control unit disables the first control signal and the fourth control signal when the output voltage is greater than an upper-limiting voltage value, and enables the first control signal and the fourth control signal when the output voltage is less than a lower-limiting voltage value.

5. The LLC resonant converter as claimed in claim 1, wherein when the switching frequency is less than the frequency threshold value, the control unit controls the phase difference to be fixed at a phase initial value, and controls the first control signal and the fourth control signal having the variable switching frequency.

6. The LLC resonant converter as claimed in claim 1, wherein the control unit comprises:
   a comparison unit configured to compare the output voltage with a reference voltage to provide an error signal,
   a voltage control unit configured to generate a frequency command according to the error signal,
   a frequency adjustment unit configured to determine the switching frequency and provide a phase adjustment signal according to the frequency command,
   a phase adjustment unit configured to adjust the phase difference according to the phase adjustment signal, and
   a pulse width modulation unit configured to adjust the first control signal and the fourth control signal according to an output of the frequency adjustment unit and an output of the phase adjustment unit.

7. The LLC resonant converter as claimed in claim 1, wherein the control unit further comprises:
   a drive circuit configured to drive the first switch according to the first control signal and drive the fourth switch according to the fourth control signal.

8. The LLC resonant converter as claimed in claim 7, wherein the control unit further comprises:
   a drive control unit configured to provide a disabled signal or an enabled signal to the drive circuit.

9. The LLC resonant converter as claimed in claim 1, wherein the control unit provides a second control signal to control the second switch, and provides a third control signal to control the third switch; the second control signal and the first control signal are complementary, and the third control signal and the fourth control signal are complementary.

10. A method of controlling an LLC resonant converter, the LLC resonant converter comprising a primary-side circuit having a first bridge arm and a second bridge arm connected in parallel, and the first bridge arm having a first switch and a second switch connected in series, and the second bridge arm having a third switch and a fourth switch connected in series, the method comprising steps of:
    providing a first control signal to control the first switch and providing a fourth control signal to control the fourth switch to convert an input voltage into an output voltage,
    adjusting a switching frequency and a phase difference of the first control signal and the fourth control signal according to the output voltage, and
    controlling the switching frequency to be fixed at a frequency threshold value and adjusting the phase difference of the first control signal and the fourth control signal when the switching frequency increases to the frequency threshold value, and
    controlling the phase difference starting to increase from a phase initial value and not exceeding a phase shift threshold value when the switching frequency to be fixed at the frequency threshold value.

11. The method of controlling the LLC resonant converter LLC as claimed in claim 10, further comprising a step of:
    detecting an output current and fixing the phase difference to operate in a burst control mode when the output current is less than a current threshold value.

12. The method of controlling the LLC resonant converter LLC as claimed in claim 11, further comprising steps of:
    disabling the first control signal and the fourth control signal in the burst control mode when the output voltage is greater than an upper-limiting voltage value, and
    enabling the first control signal and the fourth control signal in the burst control mode when the output voltage is less than a lower-limiting voltage value.

13. The method of controlling the LLC resonant converter LLC as claimed in claim 11, further comprising a step of:

enabling the first control signal and the fourth control signal when the output current is greater than the current threshold value.

14. The method of controlling the LLC resonant converter LLC as claimed in claim 11, further comprising a step of:
controlling the first control signal and the fourth control signal having the variable switching frequency, and controlling the phase difference to be fixed at a phase initial value when the switching frequency is less than the frequency threshold value.

15. The method of controlling the LLC resonant converter LLC as claimed in claim 11, further comprising steps of:
comparing the output voltage with a reference voltage and providing an error signal,
generating a frequency command according to the error signal,
providing a frequency adjustment signal to adjust the switching frequency according to the frequency command, and providing a phase adjustment signal when the switching frequency is fixed, and
providing a phase shift signal to adjust the phase difference according to the phase adjustment signal.

16. The method of controlling the LLC resonant converter LLC as claimed in claim 10, further comprising a step of:
providing a second control signal complementary to the first control signal to control the second switch, and providing a third control signal complementary to the fourth control signal to control the third switch.

* * * * *